United States Patent
Choi et al.

(10) Patent No.: US 11,034,358 B2
(45) Date of Patent: Jun. 15, 2021

(54) VEHICLE AND CONTROL METHOD THEREOF

(71) Applicants: Hyundai Motor Company, Seoul (KR); Kia Motors Corporation, Seoul (KR)

(72) Inventors: Kwon Hyoung Choi, Suwon-Si (KR); Jinhyung Lee, Seoul (KR); Dea Ki Cheong, Yongin-Si (KR)

(73) Assignees: Hyundai Motor Gompany, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/675,027

(22) Filed: Nov. 5, 2019

(65) Prior Publication Data
US 2020/0406900 A1    Dec. 31, 2020

(30) Foreign Application Priority Data
Jun. 26, 2019    (KR) .......................... 10-2019-0076181

(51) Int. Cl.
*B60W 40/08*    (2012.01)
*B60W 30/18*    (2012.01)

(52) U.S. Cl.
CPC ............ *B60W 40/08* (2013.01); *B60W 30/18* (2013.01); *B60W 2040/0809* (2013.01); *B60W 2420/42* (2013.01); *B60W 2540/043* (2020.02); *B60W 2720/106* (2013.01)

(58) Field of Classification Search
CPC ...................................................... B60W 40/08
See application file for complete search history.

(56) References Cited

U.S. PATENT DOCUMENTS

| | | | |
|---|---|---|---|
| 2014/0195477 A1* | 7/2014 | Graumann | G06F 16/24578 707/609 |
| 2014/0358376 A1* | 12/2014 | Phelan | B60W 10/04 701/41 |
| 2018/0186333 A1* | 7/2018 | Santiano | B60R 25/24 |
| 2019/0212732 A1* | 7/2019 | Takanashi | G05D 1/0276 |

* cited by examiner

*Primary Examiner* — Peter D Nolan
*Assistant Examiner* — Clarence D McCray
(74) *Attorney, Agent, or Firm* — Morgan, Lewis & Bockius LLP

(57) ABSTRACT

A vehicle may include a driving unit configured to move the vehicle, a communicator configured to communicate with an external device and a controller configured to authenticate a temporary driver and allow temporary driving by the temporary driver in a response to a driver's input received through the communicator, wherein during the temporary driving, the controller limits output of the driving unit, and controls the driving unit to limit maximum speed of the vehicle, and stores driving record of the vehicle.

18 Claims, 7 Drawing Sheets

LIMIT VEHICLE SPEED $V_2$

VEHICLE AND CONTROL METHOD THEREOF

CROSS-REFERENCE TO RELATED APPLICATION(S)

The present application claims priority to Korean Patent Application No. 10-2019-0076181, filed on Jun. 26, 2019 in the Korean Intellectual Property Office, the entire contents of which is incorporated herein for all purposes by this reference.

BACKGROUND OF THE INVENTION

Field of the Invention

The present invention relates to a vehicle and a control method thereof, and more particularly, to a vehicle and a control method thereof capable of allowing temporary driving of a temporary driver.

Description of Related Art

In general, a vehicle is a moving means or a transportation means that travels on a road or a line using fossil fuels, electricity, or the like as a power source.

The vehicle is driven by the owner of the vehicle (hereinafter referred to as the "driver"), or driven by a person (for example, a spouse or family member of the driver, etc.) allowed to drive from the driver.

For example, when using a valet service, a third party can temporarily drive the vehicle for a short time. In the case of such a driving service, theft of the vehicle or theft of valuables left in the vehicle is often caused.

The driver may double park the vehicle and leave the gear in non-neutral parking. Such double parked vehicles interfere with the driving of other parked vehicles.

Furthermore, when charging an electric vehicle, the charging time is long, it is common for the driver to leave the vehicle. As a result, the vehicle may interfere with the charging of another vehicle even after the charging of the vehicle is completed.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle and a control method thereof configured for permitting temporary driving of a temporary driver for a short time Various aspects of the present invention are directed to providing a vehicle and a control method thereof configured for allowing temporary driving of a temporary driver for a short distance.

In accordance with an aspect of the present invention, a vehicle includes a driving unit configured to move the vehicle; a communicator configured to communicate with an external device; and a controller configured to authenticate a temporary driver and allow temporary driving by the temporary driver in a response to a driver's input received through the communicator, wherein during the temporary driving, the controller may limit output of the driving unit, and controls the driving unit to limit maximum speed of the vehicle, and may store driving record of the vehicle.

The controller may receive information related to the driver's input for the temporary driving from a first user device or a server device of the driver through the communicator.

The controller may receive authentication information related to the temporary driver for the temporary driving from a second user device of the temporary driver through the communicator, and may authenticate the temporary driver based on the authentication information related to the temporary driver.

The vehicle may further include an input unit configured to receive the driver's input; and the controller may receive the input of the driver to allow the temporary driving of the temporary driver through the input unit.

The controller may limit the maximum speed of the vehicle depending on a distance from a position at which the temporary driving is started to the vehicle.

The controller may decrease the maximum speed of the vehicle depending on an increase in distance from the position at which the temporary driving is started to the vehicle.

The controller may limit the maximum speed of the vehicle depending on a time period of the temporary driving.

The controller may decrease the maximum speed of the vehicle depending on an increase and a decrease of the time period of the temporary driving.

The vehicle may further include a camera configured to photograph inside and outside of the vehicle; and a sensing unit configured to collect driving information related to the vehicle, and during the temporary driving, the controller may store an image data of the camera and detecting data of the sensing unit.

The controller may block starting by the temporary driver after the temporary driving ends.

In accordance with an aspect of the present invention, a method for controlling a vehicle include obtaining by a controller, a driver's input to allow a temporary driving by a temporary driver; authenticating, by the controller, the temporary driver in a response to the driver's input; allowing, by the controller, the temporary driving by the temporary driver; limiting, by the controller, maximum speed of the vehicle during the temporary driving; limiting, by the controller, output of the vehicle during the temporary driving; and storing, by the controller, driving record of the vehicle during the temporary driving.

Obtaining the input of the driver may include receiving information related to the driver's input for the temporary driving from a first user device or a server device of the driver through communication.

Authenticating, by the controller, the temporary driver may include receiving authentication information related to the temporary driver for the temporary driving from a second user device of the temporary driver through communication, and authenticating, by the controller, the temporary driver based on the authentication information related to the temporary driver.

Obtaining the driver's input may include receiving the driver's input to allow the temporary driving of the temporary driver through an input unit.

Limiting the maximum speed of the vehicle may include limiting the maximum speed of the vehicle depending on a distance from a position at which the temporary driving is started to the vehicle.

Limiting the maximum speed of the vehicle may include decreasing the maximum speed of the vehicle depending on an increase in distance from the position at which the temporary driving is started to the vehicle.

Limiting the maximum speed of the vehicle may include limiting the maximum speed of the vehicle depending on a time period of the temporary driving.

The method may further include decreasing the maximum speed of the vehicle depending on an increase and a decrease of the time period of the temporary driving.

The method may further include during the temporary driving, storing an image data of the camera configured to photograph inside and outside of the vehicle and detecting data of the sensing unit configured to collect driving information related to the vehicle.

The method may further include blocking starting by the temporary driver after the temporary driving ends.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
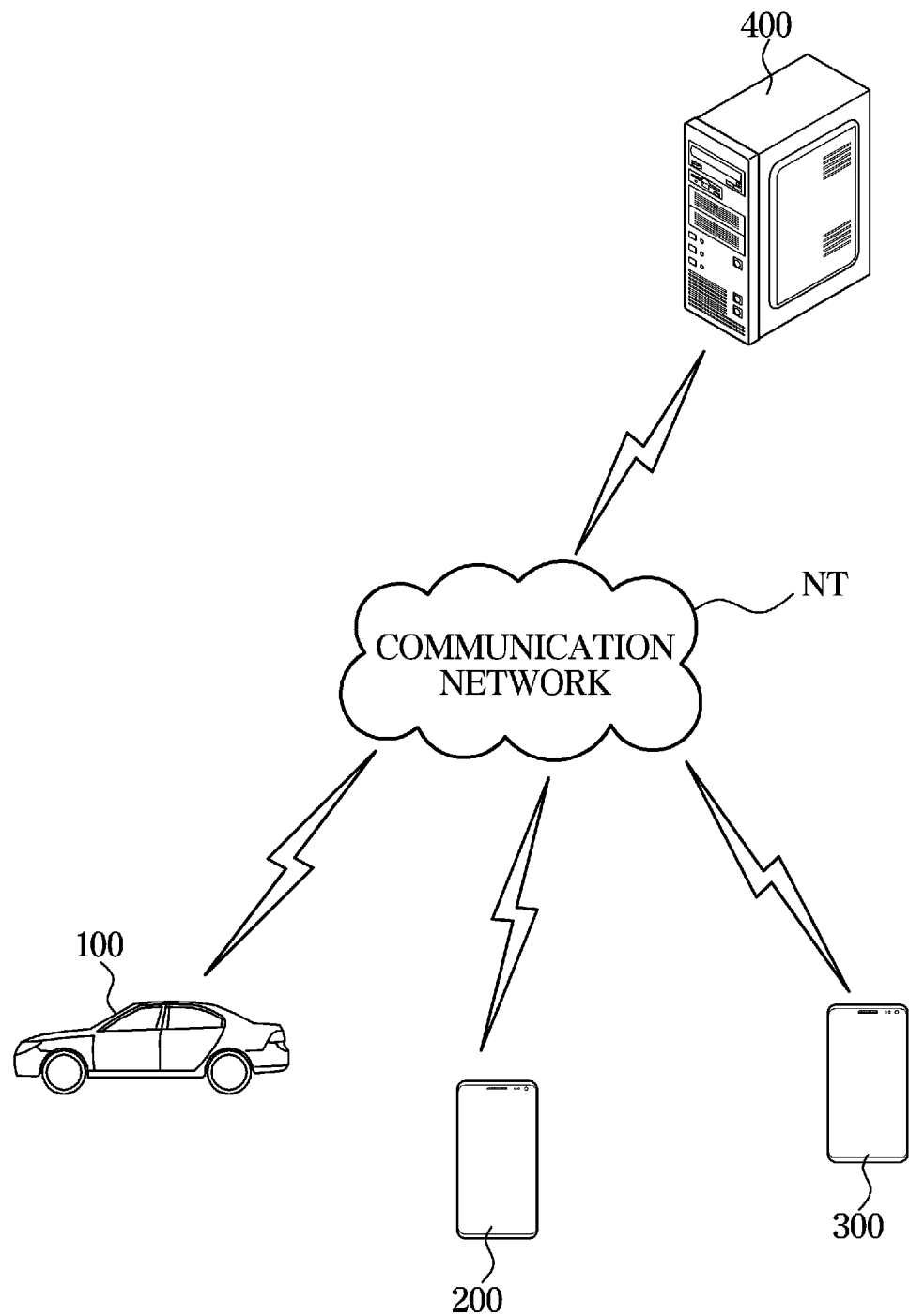
FIG. 1 is a configuration of a temporary driving system including a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terms 'unit, module, member, and block' used herein may be implemented using a software or hardware component. According to an exemplary embodiment of the present invention, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present invention will be described in detail with reference to the accompanying drawings.

FIG. 1 is a configuration of a temporary driving system including a vehicle according to an exemplary embodiment of the present invention.

The vehicle 100 may be connected to the plurality of user devices 200 and 300 and the server device 400 through a communication network NT.

The communication network NT may include both a wired communication network and a wireless communication network. Wired networks include cable or telephone networks or the Internet using Ethernet (the IEEE 802.3 standard), Wireless networks include Wi-Fi (WiFi™, IEEE 802.11 standards), Bluetooth (Bluetooth™, IEEE 802.15.1 standards), ZigBee™ (IEEE 802.15.4 standards), and Near Field Communication (NFC, ISO 13157 standards). Furthermore, wireless network may include a mobile communication service network such as time division multiple access (TDMA), code Division Multiple Access (CDMA), wideband Code Division Multiple Access (WCDMA), code Division Multiple Access 2000 (CDMA2000) and Wireless Broadband (Wibro), Worldwide Interoperability for Microwave Access (WiMAX), Long Term Evolution (LTE), and WiBro evolution. Of course, the communication network NT is not limited thereto, and may include a communication network of a communication service to be implemented in the future.

The vehicle 100 may travel on a road or a track depending on the operation of the owner of the vehicle 100 (hereinafter referred to as "driver").

The vehicle 100 may include an input means for receiving a driver's input, and the vehicle 100 may receive an input to allow a temporary driver (e.g., a parking manager, etc.) to temporarily drive the driver through the input means from the driver.

The vehicle 100 may authenticate the temporary driver in a response to the driver's input allowing the temporary driving. For example, the vehicle 100 may directly transmit the authentication key to the temporary driver or request the server device 400 to transmit the authentication key to the temporary driver. For example, the vehicle 100 may compare the authentication key transmitted to the temporary driver and the input key input from the temporary driver, and authenticate the temporary driver based on whether the authentication key and the input key match.

When authentication of the temporary driver is completed, the vehicle 100 may temporarily travel depending on the operation of the temporary driver. Temporary driving is limited to within the reference distance within the reference time, the speed and output of the vehicle 100 may be limited.

When the temporary driving is completed, the vehicle 100 may not be restarted by the temporary driver.

The plurality of user devices 200 and 300 may include a first user device 200 carried by the driver and a second user device 300 carried by the temporary driver.

The first user device 200 may authenticate the driver of the vehicle 100.

The first user device 200 may receive a driver's input from the driver through an input means driver (for example, an input button or a touch screen display) for allowing a temporary driving of the temporary driver.

The first user device 200 may transmit information related to the driver's input to the vehicle 100 in a response to the driver's input allowing temporary driving. The first user device 200 may transmit information related to the driver's input to the vehicle 100 using, for example, a wireless communication standard such as Wi-Fi, Bluetooth, and NFC.

The first user device 200 may authenticate the temporary driver in a response to a driver's input for allowing temporary driving. For example, the first user device 200 may directly transmit the authentication key to the temporary driver. Furthermore, the first user device 200 may request the server device 400 or the vehicle 100 to transmit the authentication key to the temporary driver so that the vehicle 100 authenticates the temporary driver.

The second user device 300 may receive an authentication key from the vehicle 100, the first user device 200, or the server device 400, and transmit an input key for authenticating, by the controller, the temporary driver to the vehicle 100. The second user device 300 may transmit the information related to the authentication key to the vehicle 100 using, for example, a wireless communication standard such as Wi-Fi, Bluetooth, and NFC.

The server device 400 may authenticate the temporary driver in a response to a request of the vehicle 100 or the first user device 200. For example, the server device 400 may transmit the authentication key to the temporary driver.

Figure 2:
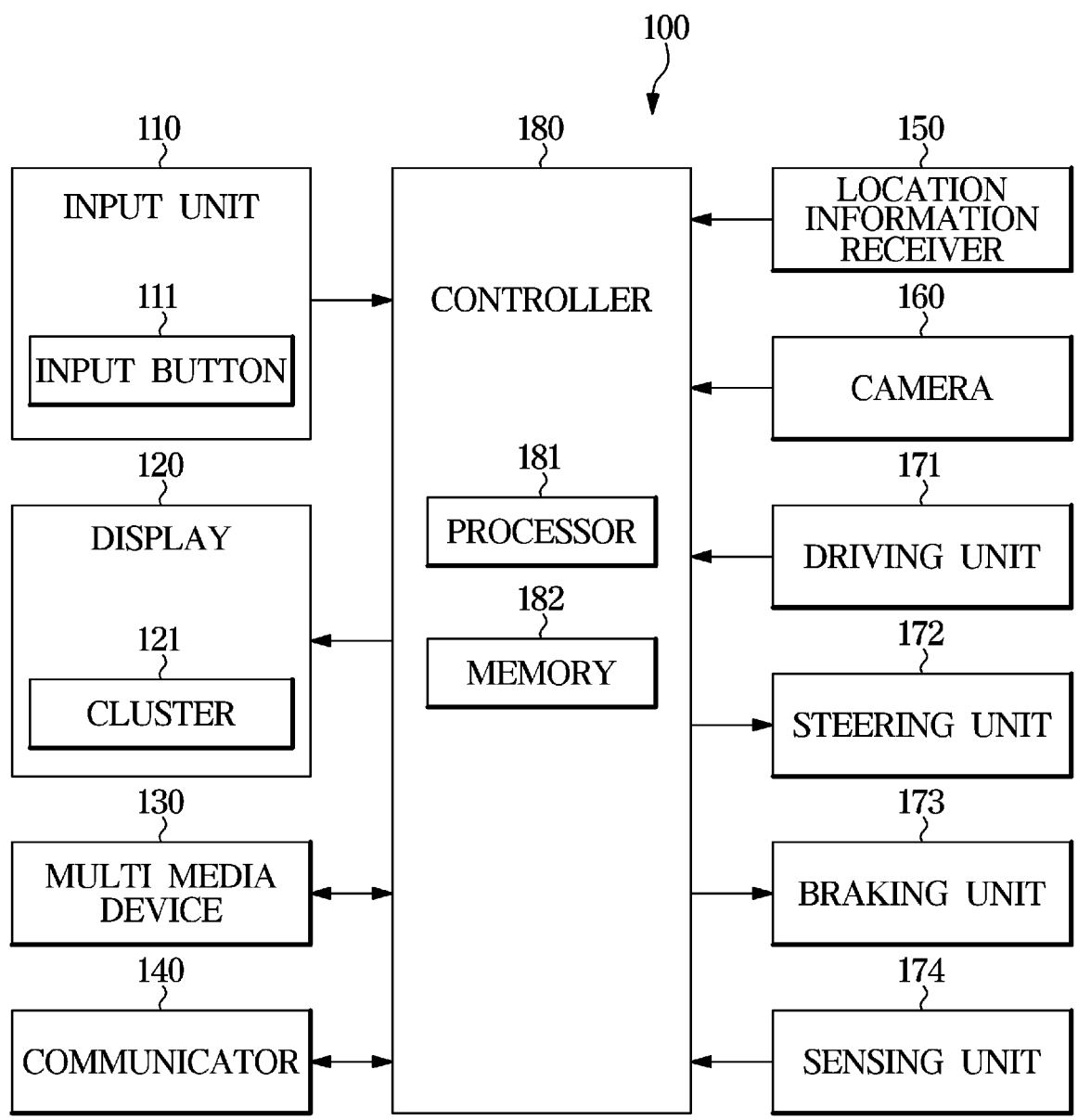
FIG. 2 is a configuration of a vehicle according to an exemplary embodiment of the present invention.
Figure 3:
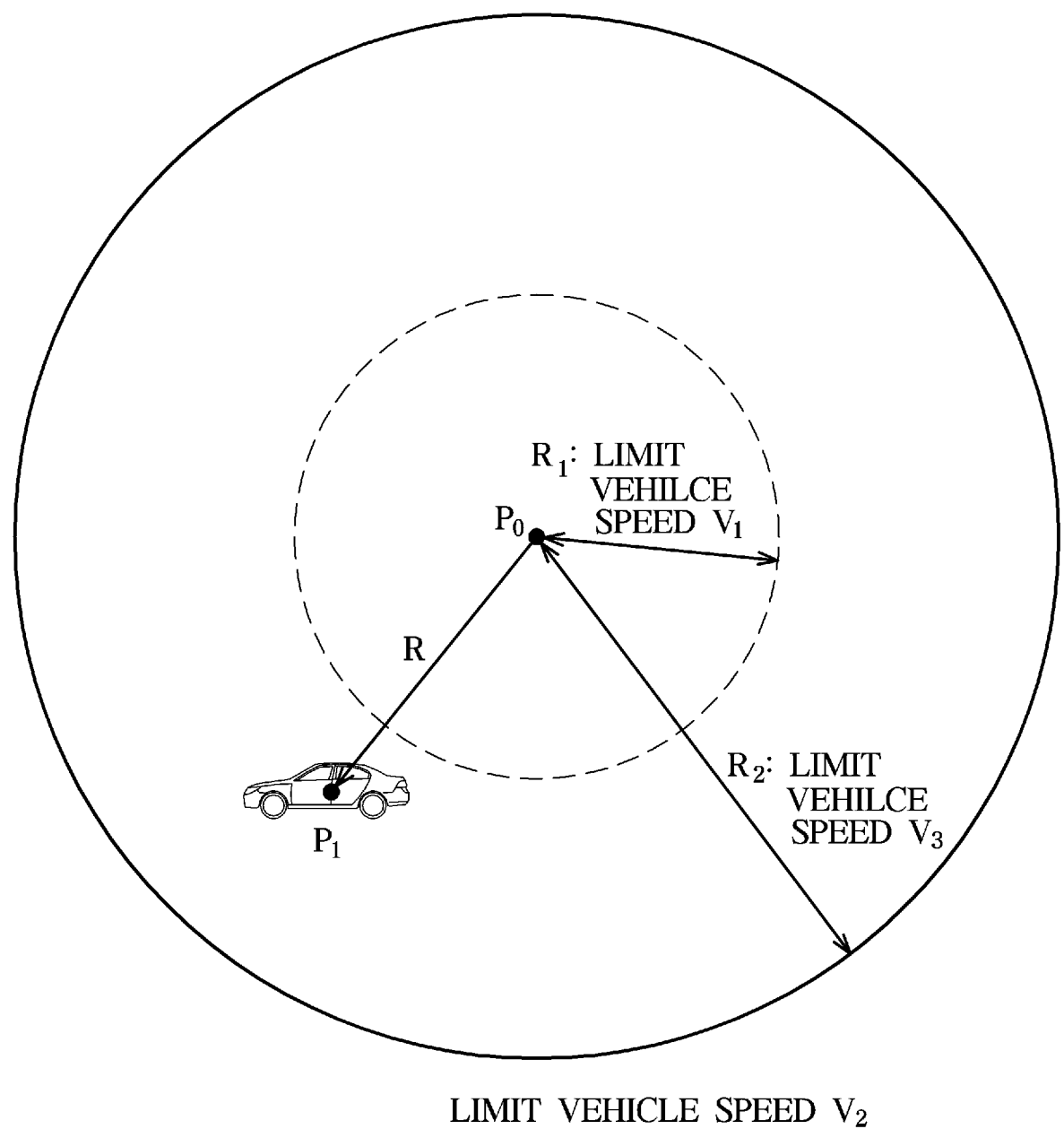
FIG. 3 shows speed limit of a vehicle according to a distance from a vehicle to a reference position according to an exemplary embodiment of the present invention.

FIG. 2 is a configuration of a vehicle according to an exemplary embodiment of the present invention. FIG. 3 shows speed limit of a vehicle according to a distance from a vehicle to a reference position according to an exemplary embodiment of the present invention.

The vehicle 100 includes an input unit 110, a display 120, a multimedia device 130, a communicator 140, a location information receiver 150, a camera 160, a driving unit 171, the steering unit 172, a braking unit 173, a sensing unit 174, and a controller 180.

The input unit 110 may receive a driver's input from the driver and output an electrical signal corresponding to the driver's input to the controller 180. The input unit 110 may include, for example, an input button 111 for receiving an input of a driver for allowing temporary driving of the temporary driver. The input button 111 may transmit a signal to the controller 180 to allow temporary driving depending on the driver's input.

The display 120 includes a cluster 121 that displays an operation of the vehicle 100 (e.g., the speed of the vehicle, the fuel amount remaining, the rotation speed of the engine, etc.). The display 120 may receive a message or an image indicating temporary driving from the controller 180 in a response to an input for temporary driving received through the input unit 110, and display the received message or image.

The multimedia device 130 may output music or an image according to the driver's input. Furthermore, the multimedia device 130 may display a route to a destination input by the driver.

The multimedia device 130 may include a touch screen for receiving a driver's input and displaying an image and information. For example, the multimedia device 130 may receive a driver's input for allowing temporary driving of the temporary driver through the touch screen. The multimedia device 130 may provide a signal for temporary driving to the controller 180 through an in-vehicle communication network.

The communicator 140 may communicate with external devices such as the first user device 200, the second user device 300, and the server device 400. For example, the communication unit 140 transmits an authentication key for authenticating, by the controller, the temporary driver to the second user device 300 or receives an authentication key to authenticate the temporary driver from the first user device 200 or the server device 400.

The communicator 140 may communicate with an external device using a wireless communication standard such as Wi-Fi, Bluetooth, and NFC.

The location information receiver 150 may receive a GPS signal from a plurality of global positioning system (GPS) satellites. The location information receiver 150 may transmit the received GPS signal to the controller 180, and the controller 180 may identify the location of the vehicle 100 based on the received GPS signal.

The camera 160 may photograph the outside and/or the interior of the vehicle 100, and output the captured image data to the controller 180. The controller 180 may process photographed image data and store the image data.

The driving unit 171 may generate power for moving the vehicle 100. The driving unit 171 may include, for example, an engine, a transmission, an accelerator pedal, and the like, and may control the output of the engine, for example, depending on the position of the accelerator pedal.

The steering unit 172 may change the driving direction of the vehicle 100. The steering unit 172 may include, for example, a steering wheel, and for example, may set a driving direction of the vehicle 100 depending on the rotation of the steering wheel.

The controller 180 may stop the vehicle 100. The braking unit 173 may include, for example, a brake and a brake pedal, and may decelerate the vehicle 100 depending on, for example, the position of the brake pedal.

The sensing unit 174 may collect various types of information related to driving of the vehicle 100. The sensing unit 174 may include, for example, a wheel speed sensor that detects the rotation speed of the wheel, an engine detection sensor that detects the rotation speed of the engine, and the like.

The controller 180 may control the operation of various components included in the vehicle 100.

The controller 180 may receive a driver's input for allowing temporary driving of the temporary driver. For example, the controller 180 may receive a driver's input for allowing temporary driving directly from the input unit 110. Furthermore, the controller 180 may receive a driver's input for allowing temporary driving through the communicator 140 from the first user device 200 of the driver.

In a response to the driver's input for allowing the temporary driving, the controller 180 may authenticate the temporary driver. For example, the controller 180 may control the communicator 140 to transmit the authentication key to the second user device 300 of the temporary driver. The controller 180 may control the communicator 140 to transmit a request for transmitting an authentication key to the second user device 300 of the temporary driver to the first user device 200 of the driver. The controller 180 may control the communicator 140 to transmit the request for transmitting the authentication key to the second user device 300 of the temporary driver to the server device 400.

Furthermore, the controller 180 may receive an input key for authentication of the temporary driver from the second user device 300 and compare the input key received from the second user device 300 with the authentication key. In a response to the input key being the same as the authentication key, the controller 180 can authenticate the temporary driver.

If the temporary driver is authenticated, the controller 180 may allow temporary driving of the vehicle 100. For example, the controller 180 may control the door lock device to open the door of the vehicle 100. The controller 180 may control the engine of the driving unit 171 to start the vehicle 100.

The controller 180 may limit the speed of the vehicle 100 and also limit the output of the engine during the temporary driving. Furthermore, the controller 180 may limit the traveling time of the temporary driving and limit the driving distance during the temporary driving.

The controller 180 may receive a GPS signal from the location information receiver 150 and identify a current location P1 of the vehicle 100 based on the GPS signal. Furthermore, the controller 180 may determine the distance from the reference position P1 to the vehicle 100 based on the position P0 at which temporary driving is started (hereinafter referred to as "reference position") P0 and the current position P1 of the vehicle 100, and the speed of the vehicle 100 may be limited depending on the distance r from the reference position P0 to the current position P1 of the vehicle 100.

For example, as shown in FIG. 3, when the distance r from the reference position P1 to the current position P1 of the vehicle 100 is smaller than the first distance R1, the controller 180 may determine to limit speed of the vehicle 100 to the first speed V1. Furthermore, when the distance r from the reference position P1 to the current position P1 of the vehicle 100 is greater than or equal to the second distance R2, the controller 180 sets the speed of the vehicle 100 to be the second speed V2. In the instant case, the second distance R2 may be greater than the first distance R1.

When the distance r from the reference position P1 to the current position P1 of the vehicle 100 is greater than or equal to the first distance R1 and smaller than the second distance R2, the controller 180 may limit the speed of the vehicle 100 to the third speed V3. In the instant case, the third speed V3 may be determined from the first distance R1, the second distance R2, the first speed V1, and the second speed V2. For example, the third speed V3 may be determined by Equation 1 below.

$$V_3 = V_1 + \left(\frac{V_2 - V_1}{R_2 - R_1}\right) * (r - R_1).$$ [Equation 1]

Here, V3 represents the third speed, V2 represents the second speed, V1 represents the first speed, R2 represents the second distance, R1 represents the first distance, r represents the distance from the reference position to the current position of the vehicle.

If the GPS signal is not received from the location information receiver 150, the controller 180 may limit the speed of the vehicle 100 based on the travel time after the temporary driver is authenticated.

For example, if the driving time of the temporary driving is less than the first time T1, the controller 180 may limit the speed of the vehicle 100 to the first speed V1. If the driving time of the temporary driving is greater than or equal to the second time T2, the controller 180 may limit the speed of the vehicle 100 to the second speed V2. In the instant case, the second time T2 may be greater than the first time T1.

If the driving time of the temporary driving is greater than or equal to the first time T1 and less than the second time T2, the controller 180 may limit the speed of the vehicle 100 to the third speed V3. In the instant case, the third speed V3 may be determined from the first time T1, the second time T2, the first speed V1, and the second speed V2. For example, the third speed V3 may be determined by Equation 2.

$$V_3 = V_1 + \left(\frac{V_2 - V_1}{T_2 - T_1}\right) * (t - T_1).$$ [Equation 2]

Here, V3 represents the third speed, V2 represents the second speed, V1 represents the first speed, T2 represents the second time, T1 represents the first time, and t represents the travel time of the temporary driving.

The controller 180 may store driving information and image information related to the vehicle 100 during temporary driving. For example, during temporary driving, the controller 180 may store driving information related to the vehicle 100 detected by the sensing unit 174 and store image data photographed by the camera 160.

Also, if the ignition is turned off during temporary driving, the controller 180 may not allow restart.

The controller 180 includes a processor 181 for providing a control signal for controlling the vehicle 100 and a memory 182 for storing a program and/or data for controlling the vehicle 100.

Figure 4:
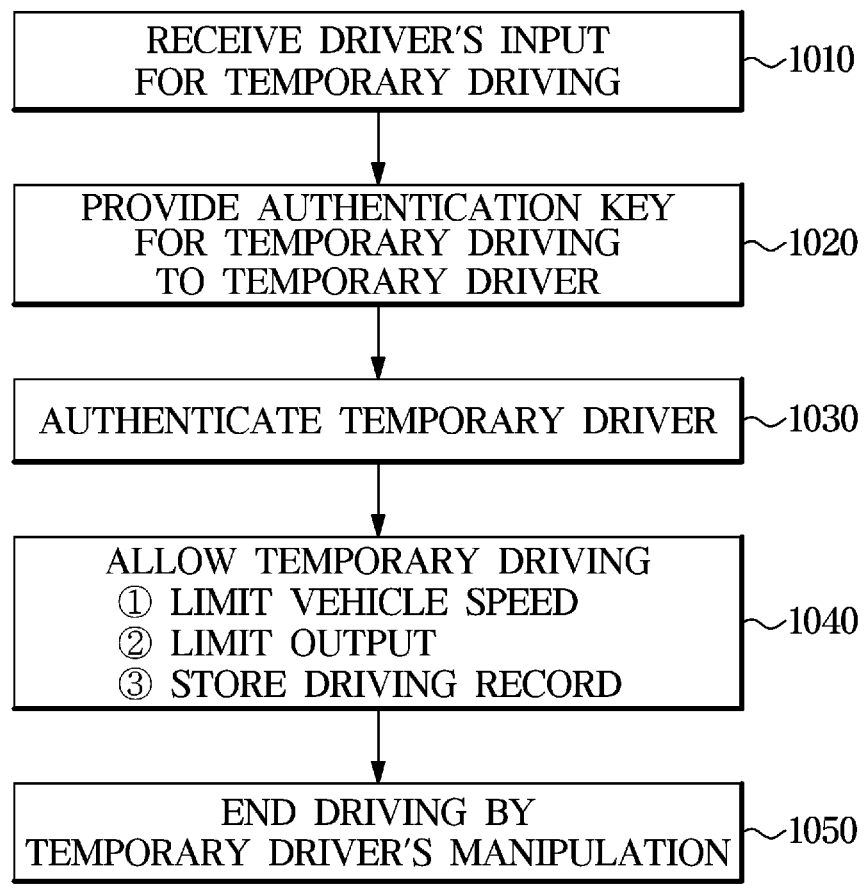
FIG. 4 shows temporary driving method of a vehicle according to an exemplary embodiment of the present invention.
Figure 5:
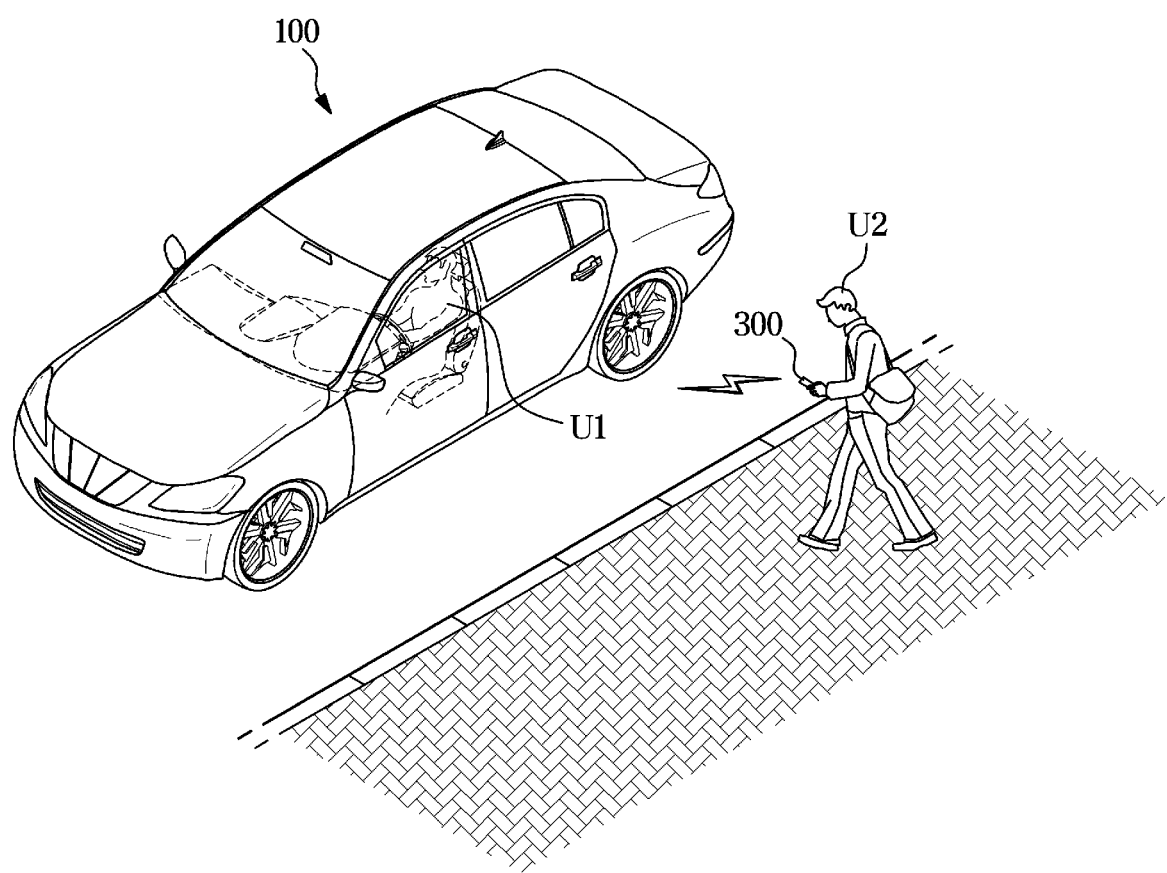
FIG. 5 shows an example of temporary driving of a vehicle, according to an exemplary embodiment of the present invention.
Figure 6:
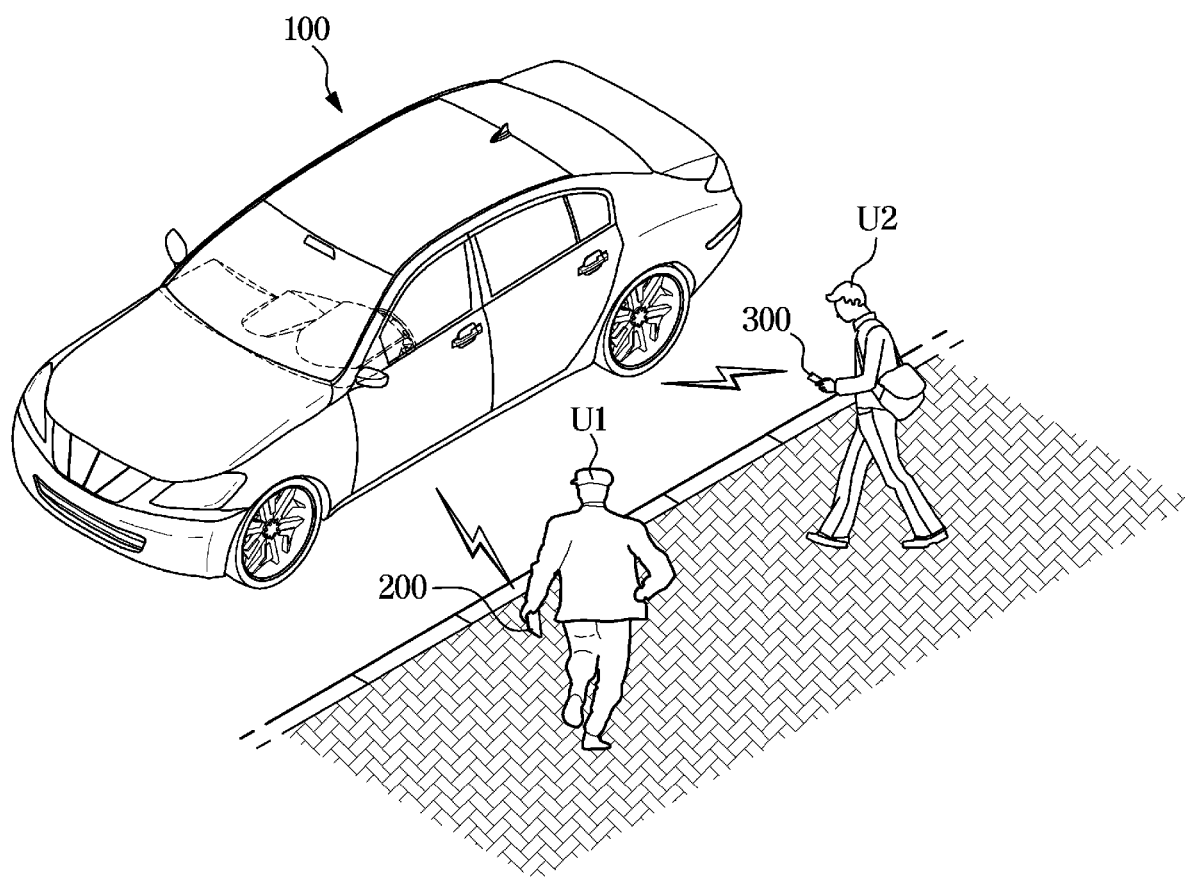
FIG. 6 shows another example of temporary driving of a vehicle, according to an exemplary embodiment of the present invention.
Figure 7:
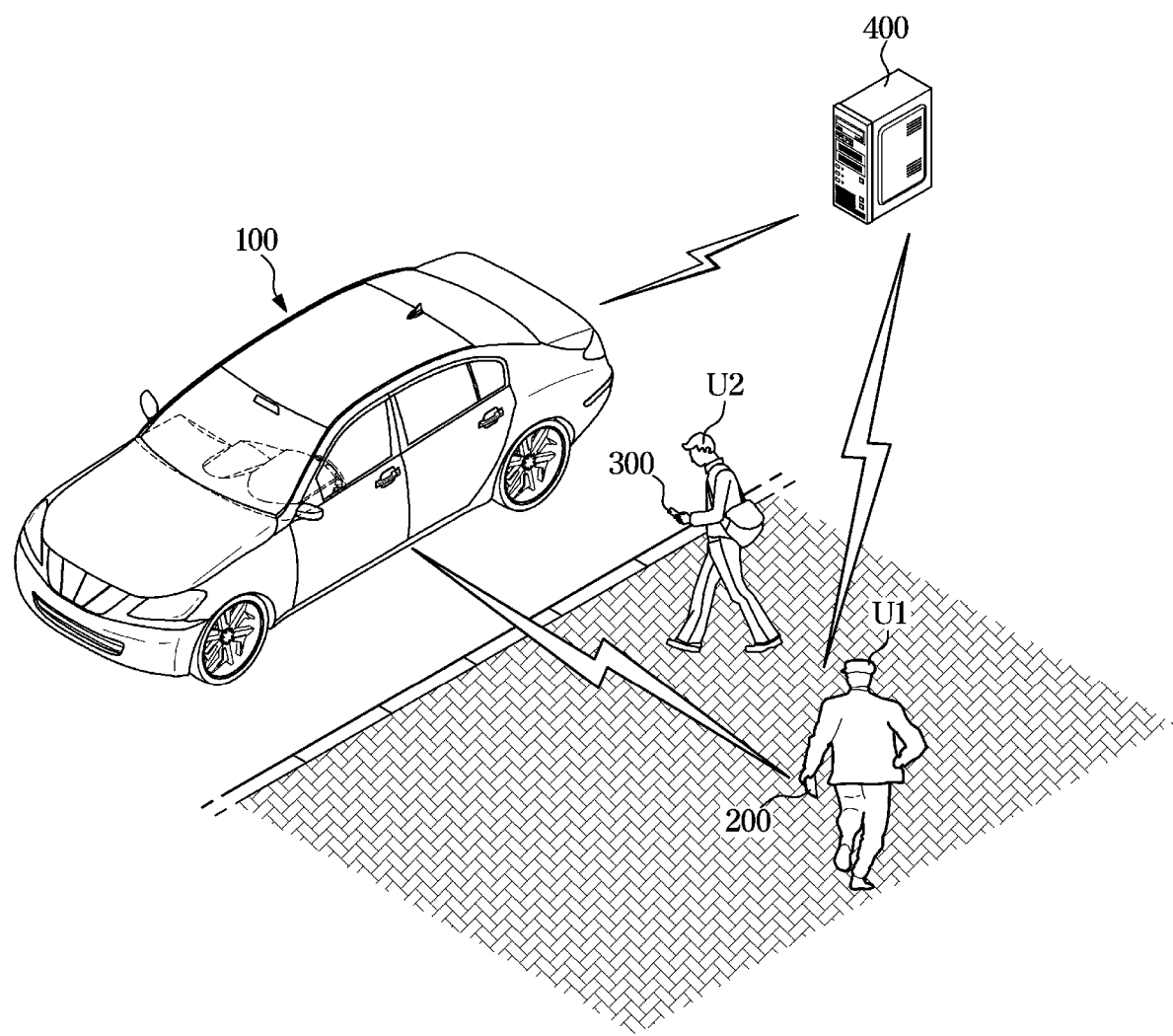
FIG. 7 shows the other example of temporary driving of a vehicle, according to an exemplary embodiment of the present invention.

FIG. 4 shows temporary driving method of a vehicle according to an exemplary embodiment of the present invention. FIG. 5 shows an example of temporary driving of a vehicle, according to an exemplary embodiment of the present invention. FIG. 6 shows another example of temporary driving of a vehicle, according to an exemplary embodiment of the present invention. FIG. 7 shows the other example of temporary driving of a vehicle, according to an exemplary embodiment of the present invention.

With FIGS. 4, 5, 6, and 7, a temporary driving method 1000 of the vehicle 100 is described.

The vehicle 100 receives a driver's input for temporary driving (1010).

For example, the vehicle 100 may receive a driver's input for temporary driving from the driver U1 through the input unit 110 as illustrated in FIG. 5.

The vehicle 100 may receive a driver's input for temporary driving through, for example, the communicator 140. When the driver U1 is located near the vehicle 100, the vehicle 100 may receive a driver's input directly from the first user device 200, as shown in FIG. 6, and when the driver U1 is located far from the vehicle 100, the driver U1 may receive the driver's input through the server device 400 as shown in FIG. 7.

The vehicle 100 provides an authentication key for temporary driving to the temporary driver (1020).

For example, as shown in FIG. 5, the vehicle 100 may transmit an authentication key for temporary driving to the second user device 300 of the temporary driver U2 through the communicator 140.

The vehicle 100 may, for example, request the second user device 300 to transmit an authentication key for temporary driving. As shown in FIG. 6, the vehicle 100 may request the first user device 200 to transmit an authentication key for temporary driving to the second user device 300. Furthermore, the vehicle 100 may request the server device 400 to transmit the authentication key for temporary driving to the second user device 300 as shown in FIG. 7.

The vehicle 100 authenticates 1030 the temporary driver (1030).

The controller 180 compares the authentication key transmitted to the second user device 300 of the temporary driver U2 with the input key received from the second user device 300 of the temporary driver U2, and authenticates the temporary driver based on whether the authentication key and the input key match. If the input key is the same as the authentication key, the controller 180 may complete authentication of the temporary driver.

The vehicle 100 allows temporary driving of the temporary driver (1040).

The vehicle 100 may, for example, allow limited temporary drive.

The controller 180 may limit the maximum speed of the vehicle 100 depending on the distance from the reference position. For example, if the distance from the reference position is less than the first distance R1, the controller 180 limits the speed of the vehicle 100 to the first speed V1, and if the distance from the reference position is greater than or equal to the second distance R2, the controller 180 limits the speed of the vehicle 100 to the second speed V2. Furthermore, the controller 180 sets the speed of the vehicle 100 as a third speed V3 between the first speed V1 and the second speed V2 when the distance from the reference position is between the first distance R1 and the second distance R2.

The controller 180 may limit the maximum speed of the vehicle 100 depending on the time of the temporary driving. For example, the controller 180 limits the speed of the vehicle 100 to the first speed V1 when the temporary driving time is less than the first time T1, and limits the speed of the vehicle 100 to the second speed V2 when the temporary driving time is greater than or equal to the second time T2. Furthermore, the controller 180 limits the vehicle speed of the vehicle 100 to the third speed V3 between the first speed V1 and the second speed V2

The controller 180 may limit the maximum output of the driving device (e.g., engine, motor, etc.).

The controller 180 may store driving records and photographed image data during temporary driving. The vehicle 100 ends driving in accordance with the operation of the temporary driver (1050).

The temporary driver U2 (e.g., the parking agent) may turn off the start after parking the vehicle 100 in the designated parking space.

The controller 180 may not allow restart by the temporary driver U2 after the startup is turned off.

The controller 180 may not allow the gear to be changed back to the driving state by the temporary driver U2 after the gear is changed from the driving state to the parking state.

The controller 180 may not allow unlocking by the temporary driver U2 after the door is changed to the locked state.

The above-mentioned embodiments may be implemented in a form of a recording medium storing commands configured for being executed by a computer system. The commands may be stored in a form of program code. When the commands are executed by the processor, a program module is generated by the commands so that the operations of the disclosed exemplary embodiments may be conducted. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few embodiments of the present invention have been shown and described, it would be appreciated by those skilled in the art that changes may be made in these embodiments without departing from the principles and spirit of the present invention, the scope of which is defined in the claims and their equivalents.

In accordance with an aspect of the present invention, it is possible to provide a vehicle and controlling method thereof allowing temporary driving of a temporary driver for a short time.

In accordance with an aspect of the present invention, it is possible to provide a vehicle and controlling method thereof allowing temporary driving of a temporary driver for a short distance.

In accordance with an aspect of the present invention, it is possible to improve the merchandise of the vehicle by increasing the convenience of parking.

In accordance with an aspect of the present invention, the next charger may move the charged vehicle even if the driver leaves the vehicle after the start of charging.

In accordance with an aspect of the present invention, the driver may use a valet parking service without providing a key to the driving agent.

In accordance with an aspect of the present invention, the driver of another vehicle may move the vehicle even if the driver leaves the vehicle after the double parking.

In accordance with an aspect of the present invention, the security problem is solved because the inside and outside of the vehicle is photographed and the driving record is stored.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a driving unit configured to move the vehicle;
a communicator configured to communicate with an external device; and
a processor configured to authenticate a temporary driver and allow temporary driving by the temporary driver in a response to a driver's input received through the communicator,
wherein, during the temporary driving, the processor is configured to limit output of the driving unit, and to control the driving unit to limit maximum speed of the vehicle, and to store driving record of the vehicle, and
wherein the processor is configured to block starting of the vehicle by the temporary driver in response to turning off startup after parking the vehicle.

2. The vehicle according to claim 1, wherein the processor is configured to receive information related to the driver's input for the temporary driving from a first user device or a server device of the driver through the communicator.

3. The vehicle according to claim 2, wherein the processor is configured to receive authentication information related to the temporary driver for the temporary driving from a second user device of the temporary driver through the communicator, and to authenticate the temporary driver based on the authentication information related to the temporary driver.

4. The vehicle according to claim 1, further including:
an input unit configured to receive the driver's input; and,
wherein the processor is configured to receive the driver's input to allow the temporary driving of the temporary driver through the input unit.

5. The vehicle according to claim 1, wherein the processor is configured to limit the maximum speed of the vehicle depending on a distance from a position at which the temporary driving is started to the vehicle.

6. The vehicle according to claim 5, wherein the processor is configured to decrease the maximum speed of the vehicle depending on an increase in distance from the position at which the temporary driving is started to the vehicle.

7. The vehicle according to claim 1, wherein the processor is configured to limit the maximum speed of the vehicle depending on a time period of the temporary driving.

8. The vehicle according to claim 7, wherein the processor is configured to decrease the maximum speed of the vehicle depending on an increase and a decrease of the time period of the temporary driving.

9. The vehicle according to claim 1, further including:
a camera configured to capture an image of inside and outside of the vehicle; and
a sensing unit configured to collect driving information related to the vehicle,
wherein during the temporary driving, the processor is configured to store an image data of the camera and detecting data of the sensing unit.

10. A method of controlling a vehicle, the method comprising:
obtaining by a processor, a driver's input to allow a temporary driving by a temporary driver;
authenticating, by the processor, the temporary driver in a response to the driver's input;
allowing, by the processor, the temporary driving by the temporary driver;
limiting, by the processor, a maximum speed of the vehicle during the temporary driving;
limiting, by the processor, output of the vehicle during the temporary driving; and
storing, by the processor, driving record of the vehicle during the temporary driving;
identifying, by the processor, turning off startup after parking the vehicle; and
blocking, by the processor, starting of the vehicle by the temporary driver in response to the turning off startup after parking the vehicle.

11. The method according to claim 10, wherein the obtaining the driver's input includes receiving information related to the driver's input for the temporary driving from a first user device or a server device of the driver through communication.

12. The method according to claim 11, wherein the authenticating the temporary driver includes receiving authentication information related to the temporary driver for the temporary driving from a second user device of the temporary driver through communication, and authenticating, by the processor, the temporary driver based on the authentication information related to the temporary driver.

13. The method according to claim 10, wherein the obtaining the driver's input includes receiving the driver's input to allow the temporary driving of the temporary driver through an input unit.

14. The method according to claim 10, wherein the limiting the maximum speed of the vehicle includes limiting the maximum speed of the vehicle depending on a distance from a position at which the temporary driving is started to the vehicle.

15. The method according to claim 14, wherein the limiting the maximum speed of the vehicle includes decreasing the maximum speed of the vehicle depending on an increase in distance from the position at which the temporary driving is started to the vehicle.

16. The method according to claim 10, wherein the limiting the maximum speed of the vehicle includes limiting the maximum speed of the vehicle depending on a time period of the temporary driving.

17. The method according to claim 16, further including decreasing the maximum speed of the vehicle depending on an increase and a decrease of the time period of the temporary driving.

18. The method according to claim 10, further including:
during the temporary driving, storing an image data of a camera configured to capture an image of inside and outside of the vehicle and detecting data of a sensing unit configured to collect driving information related to the vehicle.

* * * * *